(12) United States Patent
Rider et al.

(10) Patent No.: US 9,460,453 B2
(45) Date of Patent: Oct. 4, 2016

(54) SYSTEM AND METHOD TO PROVIDE LOCATION-BASED DIGITAL SIGNAGE SERVICES

(71) Applicant: Intel Corporation, Santa Clara, CA (US)

(72) Inventors: Tomer Rider, Naahryia (IL); Justin Lipman, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,312

(22) PCT Filed: Mar. 13, 2013

(86) PCT No.: PCT/CN2013/072521
§ 371 (c)(1),
(2) Date: Jun. 3, 2013

(87) PCT Pub. No.: WO2014/139098
PCT Pub. Date: Sep. 18, 2014

(65) Prior Publication Data
US 2014/0304072 A1    Oct. 9, 2014

(51) Int. Cl.
G06Q 30/00    (2012.01)
G06Q 30/02    (2012.01)
H04W 76/02    (2009.01)

(52) U.S. Cl.
CPC ....... *G06Q 30/0255* (2013.01); *H04W 76/023* (2013.01)

(58) Field of Classification Search
CPC .................................................. G06Q 30/0255
See application file for complete search history.

(56) References Cited

U.S. PATENT DOCUMENTS

| 9,135,612 B1* | 9/2015 | Proctor, Jr. .......... G06Q 20/202 |
| 2003/0074259 A1* | 4/2003 | Slyman, Jr. .......... G06Q 20/204 705/14.22 |

(Continued)

FOREIGN PATENT DOCUMENTS

| CN | 101878487 A | 11/2010 |
| CN | 102842275 A | 12/2012 |

(Continued)

OTHER PUBLICATIONS

International Application Serial No. PCT/CN2013/072521, International Preliminary Report on Patentability mailed Sep. 15, 2015, 5 pgs.

(Continued)

*Primary Examiner* — Amanda Abrahamson
*Assistant Examiner* — Scott C Anderson
(74) *Attorney, Agent, or Firm* — Schwegman Lundberg & Woessner, P.A.

(57) ABSTRACT

Embodiments for providing intelligent location-based signage services are generally described herein. An intelligent signage device may include a proximity module arranged to receive a notification that a personal device is within an area of the intelligent signage device. The signage may also include a transceiver arranged to establish a connection from the intelligent signage device to the personal device and receive user data from the personal device via the connection. An offer-customization module of the digital signal may be arranged to determine a set of display options based on the user data, a member of the set of display options corresponding to an offer for a product and a presentation module of the digital signage may be arranged to display the member of the set of display options on the intelligent signage device.

25 Claims, 5 Drawing Sheets

(56) References Cited

U.S. PATENT DOCUMENTS

| | | |
|---|---|---|
| 2003/0156135 A1 | 8/2003 | Lucarelli |
| 2008/0004953 A1 | 1/2008 | Ma et al. |
| 2008/0089288 A1 | 4/2008 | Anschutz et al. |
| 2009/0256780 A1* | 10/2009 | Small ............... H04N 1/00127 345/55 |
| 2011/0016006 A1* | 1/2011 | Opdycke ............... G06Q 30/02 705/14.73 |
| 2011/0035282 A1 | 2/2011 | Spatscheck et al. |
| 2011/0307786 A1 | 12/2011 | Shuster |
| 2012/0265630 A1* | 10/2012 | McLaughlin ...... G06Q 30/0283 705/26.1 |
| 2013/0159097 A1* | 6/2013 | Schory ............... G06Q 30/0261 705/14.49 |
| 2014/0149202 A1* | 5/2014 | Owen ............... G06Q 30/0235 705/14.35 |

FOREIGN PATENT DOCUMENTS

| | | |
|---|---|---|
| CN | 105074750 A | 11/2015 |
| EP | 2345987 A1 | 7/2011 |
| KR | 1020120057668 A | 6/2012 |
| KR | 1020120099003 A | 9/2012 |
| WO | WO-2011052985 A2 | 5/2011 |
| WO | WO-2014139098 A1 | 9/2014 |

OTHER PUBLICATIONS

International Application Serial No. PCT/CN2013/072521, International Search Report mailed Dec. 19, 2013, 3 pgs.

International Application Serial No. PCT/CN2013/072521, Written Opinion mailed Dec. 19, 2013, 4 pgs.

European Application Serial No. 13877719.8, Extended European Search Report mailed Jul. 8, 2016, 6 pgs.

European Application Serial No. 13877719.8, Response filed Jul. 25, 2016 to Extended European Search Report mailed Jul. 8, 2016, 18 pgs.

Korean Application Serial No. 2015-7021829, Office Action mailed Jul. 25, 2016, W/ English Translation, 11 pgs.

"The present and future of digital signage in Japan", [Online] retrieved from the internet: <URL: http://popsign.co.kr/index_media_view.php?BRD=4&NUM=369>, (2009), 9 pgs.

* cited by examiner

SYSTEM AND METHOD TO PROVIDE LOCATION-BASED DIGITAL SIGNAGE SERVICES

PRIORITY APPLICATIONS

This application is a U.S. National Stage Application under 35 U.S.C. 371 from International Application No. PCT/CN2013/072521, filed Mar. 13, 2013, which is hereby incorporated by reference in its entirety.

BACKGROUND

Public digital signage is increasingly common and being deployed worldwide. It is becoming an important advertising tool for the advertising industry and is often found indoors, providing complementary advertisements and services in stores, malls, and public places.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiment.

A challenge in advertising is increasing the interaction between people and intelligent signage to make it more productive and seamless. The goal of smart signage is to be able to provide relevant advertising to a consumer. However, personal advertisements, which are displayed publically, are limited and raise privacy issues. More importantly, many visual based advertisements do not optimize presentations for individual customers.

By combining location based research, tracking customer attributes such as "proximity," "point of interest," and "indoor location," a strategy for intelligent signage placement may be enhanced.

Indoor location technologies are gaining in accuracy and popularity. Some technologies are capable of providing sub 5 meter geodetic/relative location accuracy. Some are even capable of providing point of interest and proximity accuracy up to 0.5 meters.

Figure 1:
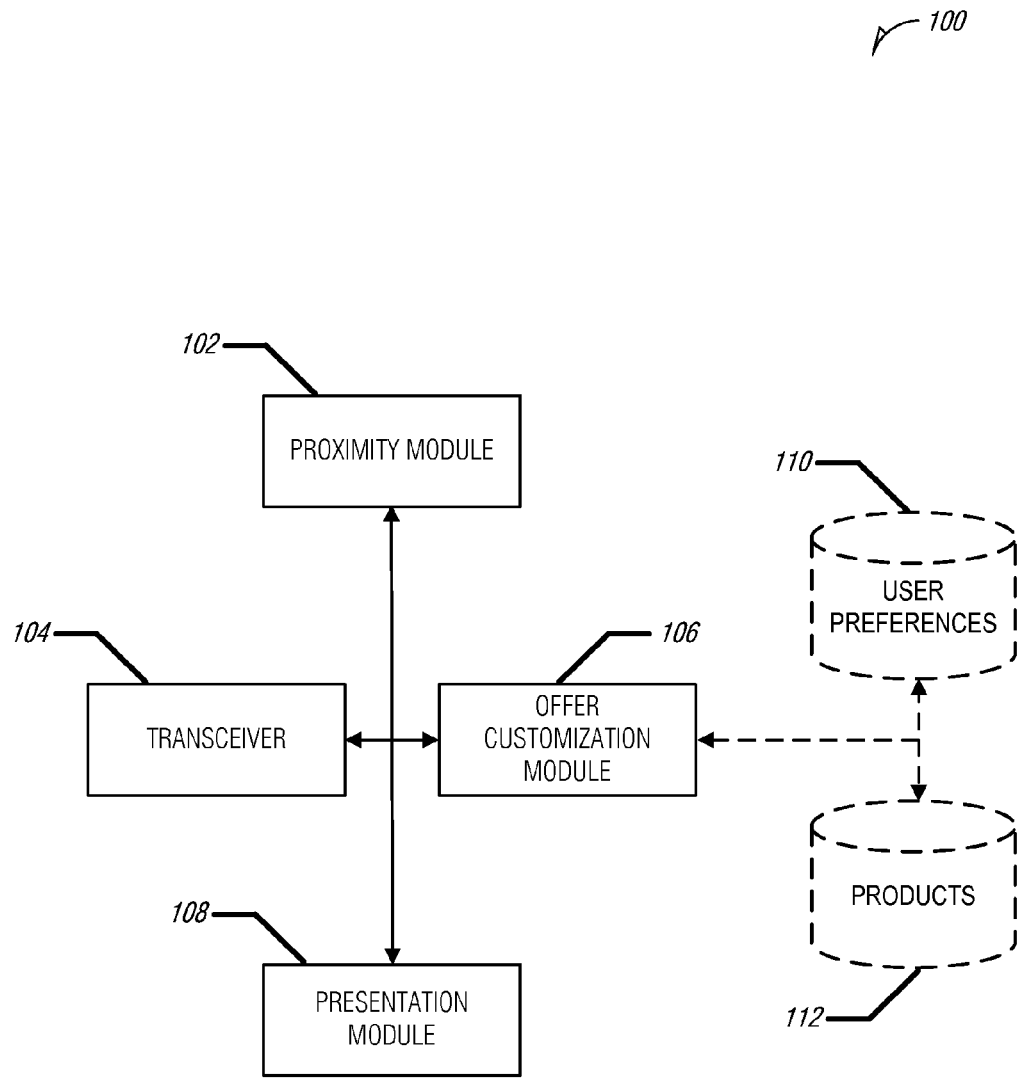
FIG. 1 is a schematic diagram illustrating an intelligent signage system, according to an embodiment.

FIG. 1 is a schematic diagram illustrating an intelligent signage system (ISS) 100, according to an embodiment. The ISS 100 includes a proximity module 102, a transceiver 104, an offer customization module 106, and a presentation module 108. In addition, the ISS 100 optionally includes a user preferences data store 110 and a products data store 112. In various embodiments, the ISS 100 may be a computing device comprising digital signage located in a retail setting, a kiosk for individual or smaller group usage, a television with additional circuitry for wireless communication, a projector system, or other forms of display technology. The user preferences data store 110 may be located at the ISS 100 or remote from the ISS 100 (e.g., in a cloud-based system). Similarly, the products data store 112 may be located locally (e.g., at or near the ISS installation) or remotely (e.g., in a cloud or on another server system).

The proximity module 102 may periodically, continuously, or regularly obtain a user's location. In an embodiment, the user's location is determined by a user's personal device (not shown) with technologies such as global positioning system (GPS), radio frequency triangulation, or other location aware services. The proximity module 102 may interface with the transceiver 104 to communicate with a server (e.g., a cloud-based service) to obtain the location of the user's personal device.

The transceiver 104 may be any type of transceiver capable of transmitting and receiving wireless signals. Examples of transceivers include, but are not limited to Bluetooth™, Wi-Fi®, cellular, radio-frequency identification (RFID), WiMAX®, and the like.

The user preferences data store 110 is used to store user data and user preference data. User preferences may be set actively by a user or may be set passively, such as by a user's behavior or other historic data. The user preferences data store 110 may include a user's identification, a user's residential address, a user's history of residential addresses, a user's age or birthdate, a user's marital status or relationship history, a user's employment status or employment history, and the like. Additionally, the user preferences data store 110 may include historical purchases or product inquires (e.g., web search results for various products). User data may be obtained from a user's personal device via emails, notes, shopping lists, calendar entries, web searches, web browsing and history, phone calls, photos, historical device location and use, and other aspects available directly or deduced from information stored on or accessible to the personal device. In an embodiment, a user may actively control which information is discoverable or available for use, or how discovered or identified information is used.

The products data store 112 include data for one or more products. A product as used in this disclosure is any good or service. Examples of goods include tangible goods, such as housewares, food, vehicles, or computers. Goods may also include virtual goods, such as coupons that are only ever available on the user's personal device. Examples of services include cleaning services, legal services, or tax services. Coupons may be for goods, services, or combinations of goods and services. The products data store 112 may include data for products available at a particular store location or products available at any store location. Additionally, the products data store 112 may include data for products that are direct-shipped from a manufacturer.

When a personal device is detected to be within a certain proximity of the ISS 100, the offer customization module 106 is used to determine one or more product offerings. The offer customization module 106 may access the user preferences data store 110 to identify one or more user preferences to individualize the product offer. Cross-referencing the products data store 112, the offer customization module 106 may then interface with the presentation module 108 to present one or more products to a user of the person device.

Figure 2:
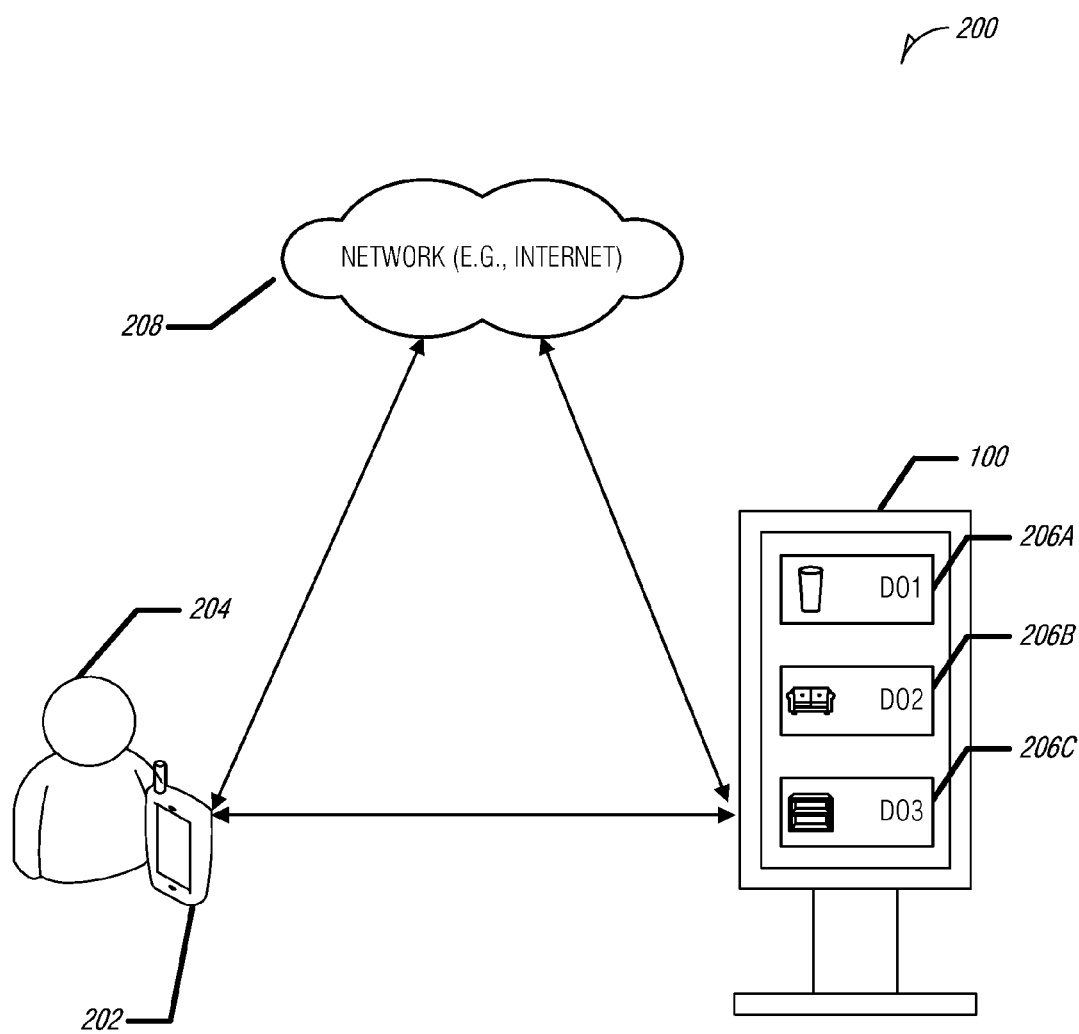
FIG. 2 is a schematic diagram illustrating a system, according to an embodiment.

FIG. 2 is a schematic diagram illustrating a system 200, according to an embodiment. The system includes a personal device 202 operated by a user 204, an intelligent signage system (ISS) 100, and a network 208. The personal device 202 is any mobile wireless device including, but not limited to a smartphone, personal digital assistant (PDA), personal computer (PC), tablet PC, mobile telephone, or the like. The network 208 may comprise a local area network (LAN), wide area network (WAN), cellular network, or other wireless data networks. The network 208 may include one or more servers, colocated or distributed (e.g., a cloud service). Such servers may provide location-based services, web-based services, or storage services (e.g., storing user data or product data).

The user 204 having the personal device 202 connects to the network 208 that provides location services. In an embodiment, the position of the personal device 202 is continuously updated. User preferences may be uploaded to the network 208 from the personal device 202 or from another user device (e.g., a home computer). The location and the user's preferences may be provided to the ISS 100, either directly from the personal device 202 or via the network 208. Upon reaching a particular place of commerce and being within a predetermined distance (e.g., 1 meter), the personal device 202 of the user 204 is recognized by the ISS 100 and the ISS 100 provides one or more offerings. Illustrated in FIG. 2 are three such offerings, including offer_1 206A, offer_2 206B, and offer_3 206C. Offers 206A-C may include text, graphics, video, or other multimedia assets. As discussed above with respect to FIG. 1, offers 206A-C may be particularly selected for the user 204.

In an embodiment, the personal device 202 includes an application that may communicate with the ISS 100. The application may be specific to a store (e.g., for SEARS®), specific to a network of intelligent signage systems, or a combination of stores with certain signage systems.

The user 204 may select one or more of the product offers 206A-C and have details of the offer transmitted to the personal device 202. The transmission may include a coupon for the product, a warehouse location for the product, or other information about the product in the offer. The user 204 may obtain details of the offer by scanning a QR code (Quick Response Code) displayed on the ISS 100, in an embodiment. Optionally, the user 204 may obtain details using a short range network such as Bluetooth™ or RFID. Optionally, the 204 may obtain details using a long range network such as a cellular, Wi-Fi®, or WiMAX® network.

In an embodiment, a cloud service residing in the network 208 may provide the ISS 100 user information (e.g., location, preferences, etc.), which may then be used to formulate one or more offers or other information to present to a local user. In another embodiment, a cloud service residing in the network 208 may provide the ISS 100 one or more offers prepared or selected for a user proximate to the ISS 100. In such an embodiment, the cloud service performs the bulk of the processing (e.g., data gathering, offer selection, and user-specific offer customization) and the ISS 100 acts primarily as a presentation interface.

Figure 3:
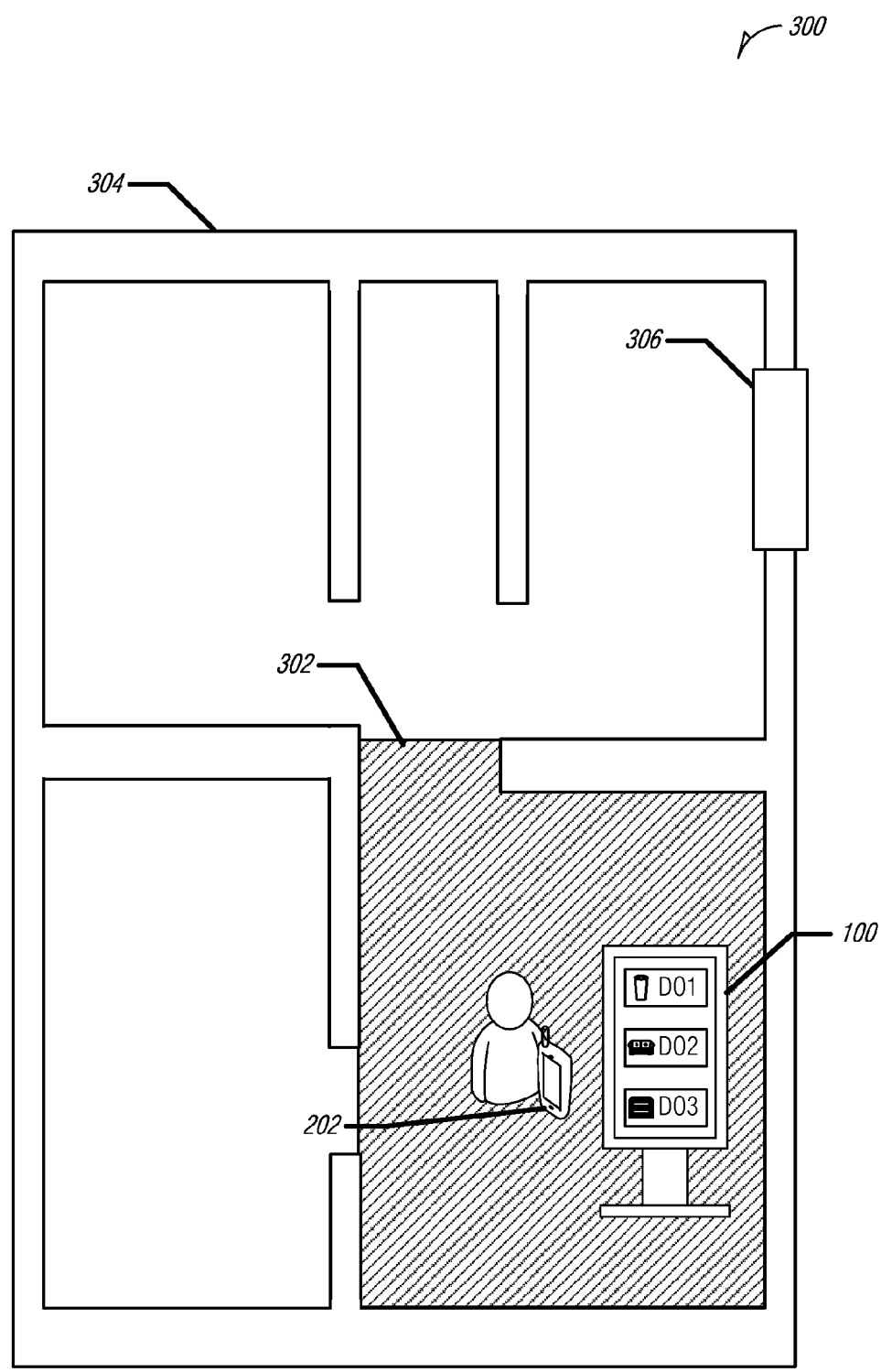
FIG. 3 is a schematic diagram illustrating a floor plan, according to an embodiment.

FIG. 3 is a schematic diagram illustrating a floor plan 300, according to an embodiment. The floor plan 300 includes a proximate area 302, a floor plan area 304, and a doorway 306. The proximate area 302 is the area around the ISS 100. When a personal device 202 is located within the proximate area 302, the ISS 100 is configured to display one or more offers. The proximate area 302 is configurable in an embodiment. While the proximate area 302 is illustrated as an area bounded by a room, it is understood that the proximate area 302 may be defined by a roughly circular area around the ISS 100. The proximate area 302 may be limited by short-range communication protocols. Further, the configuration of the proximate area 302 may be increased or reduced to enhance a user's experience. For example, a large range may be less desirable because the user may not understand that the displayed offers are for them. Also, offers may be viewable by more people, which may dilute the desired target marketing effect. However, too short of a range may be undesirable because a user may not approach the ISS 100 and the advertiser may lose out on an opportunity to present a targeted advertisement.

In an example, as the user enters the floor plan area 304 (e.g., commercial store property, mall, or shopping center) through the doorway 306, the user's entrance is detected and afterwards the user's position and movement about the floor plan area 304 are tracked. The user may log in to a system at the floor plan 300 in order to initiate such services. Alternatively, the user may configure the personal device (e.g., through an application), to automatically allow tracking and other services within the floor plan 300.

As the user moves about the floor plan 300, various statistics, measurements, or other information may be obtained. For example, the user's presence or absence in a particular store location may be used to conditionally offer one product over another product.

If the user approaches the ISS 100, user preferences may be accessed and optionally in combination with the data about the user's current visit, one or more product offers are presented. In an embodiment, the ISS 100 presents the potential products in parallel with the personal device 202 through presentation on the personal device 202 and the ISS 100. For example, the ISS 100 may send a coupon associated an item presented on the ISS 100, or additional information regarding the presented item, to the personal device 202. Additional information may include, but is not limited to product information, product recommendations, product reviews or ratings, store hours, store locations, product comparisons, etc. For example, based on user preferences, a product recommendation for specific size and color of shoe may be generated and transmitted to the personal device 202. The user may also be presented with an indication of whether the certain shoe is in stock, the price, any special offers, a return policy, etc.

After the user has collected any products for purchase, the user may conduct payment with the personal device 202, after which the purchase becomes known by the ISS 100. The ISS 100 may greet the user as the user exits the store. Optionally, the ISS 100 may send the user additional coupons or advertisements for the next visit. In an embodiment, even users that do not buy any products in the store are provided incentives as they leave the store.

Thus, according to an embodiment, a unique advertising experience is provided to a user of a personal device 202 using a combination of location-based technology and intelligent signage. An experience is provided by analyzing user behavior or habits taken from the personal device 202. Marketing information may be correlated with user inputs, preferences, historic data, and data from analysis of the user inputs, preferences, historic data, and used to offer a focused advertisement to the personal device 202. The process may be configured by the user to allow the user to control the data feed.

Preferences of the potential customer are given consideration. A potential customer may be able to determine the type of content that is of interest to ensure that the advertisement is focused and relevant for that particular potential customer. The ISS 100 may ask the user, when appropriate, if an advertisement is relevant.

A personal device 202 of a potential customer may provide a list of possible items the customer needs from various sources, such as shopping lists, calendar, etc. to the ISS 100. These items may be provided to a database for external use and comparison between vendors and shops.

In an embodiment, when multiple people are around the ISS 100, the ISS 100 may present aggregated data based on cross-referencing customer profiles of two or more people with marketing information and identifying correlations. When multiple people are determined to be related, such as by a social network, a social circle, or business relationships, the aggregated data may be modified or revised to target the specific group. For example, a family may enter a shopping mall and approach the ISS 100. The ISS 100 may determine that they are a family by information on their devices, social network information, information available to the ISS 100 (e.g., via a store customer loyalty program), etc. The ISS 100 may determine, for example, that it is a mealtime and present eateries acceptable to the family members.

Figure 4:
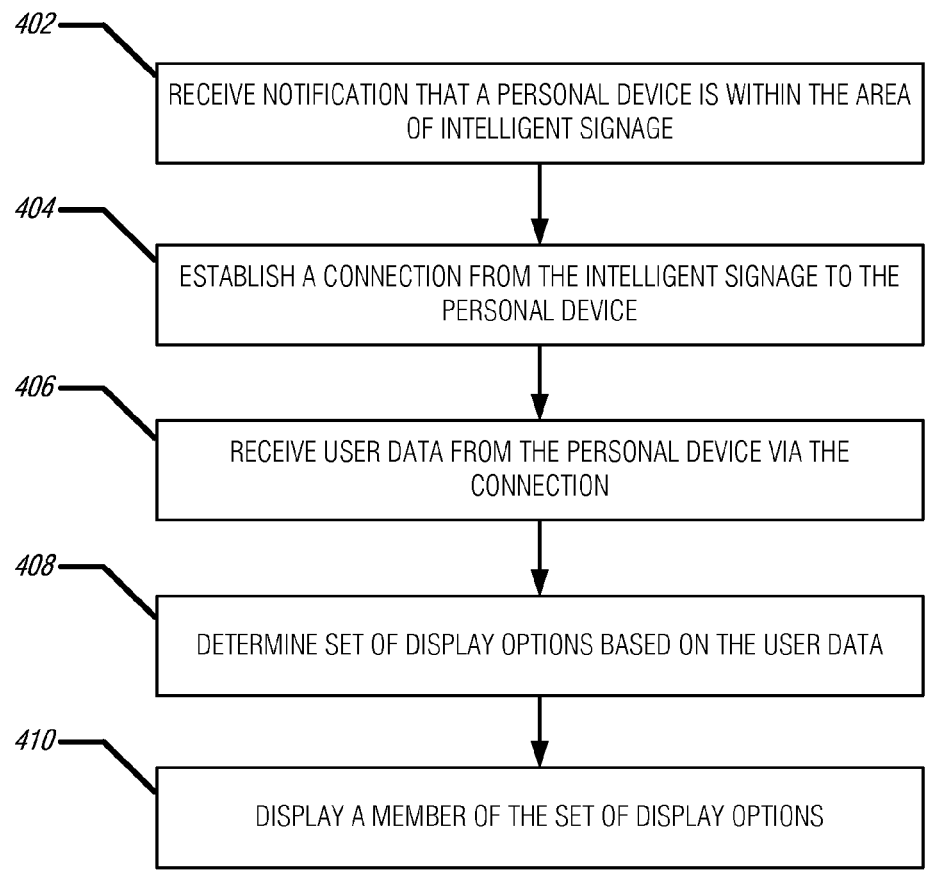
FIG. 4 is a flowchart illustrating a method for providing an intelligent signage service, according to an embodiment.

FIG. 4 is a flowchart illustrating a method 400 for providing an intelligent signage service, according to an embodiment. At 402, a notification is received at intelligent signage device that a personal device is within an area of the intelligent signage device. In an embodiment, receiving the notification includes detecting, by the intelligent signage device that the personal device is within the area.

At 404, a connection is established from the intelligent signage device to the personal device. In an embodiment, establishing the connection includes establishing a direct connection between the intelligent signage device and the personal device. In another embodiment, establishing the connection includes establishing an indirect connection between the intelligent signage device and the personal device, such as by way of a network service (e.g., cloud service).

At 406, user data is received from the personal device via the connection. In an embodiment, the user data includes a set of user preferences, the set of user preferences designated by a user of the personal device. In an embodiment, the user data includes a set of user activities, the set of user activities including at least one of user compass orientation, user purchase history, user demographic data, or user movement, the user movement including positions of the user over time within a second area, the area of the intelligent signage device being within the second area. In an embodiment, user movement includes user entry and exit of the second area. In an embodiment, determining the set of display options includes selecting a display option corresponding to an offer for a product in an area of the second area that the user has not visited within a time period based on the user movement. In an embodiment, determining the set of display options includes selecting a display option corresponding to an offer for a product in an area of the second area that the user has not visited within a time period based on the user movement. In an embodiment, the area is an area in close proximity around the intelligent signage device, and wherein the second area is a building containing the intelligent signage device.

At 408, a set of display options based on the user data is determined, where a member of the set of display options corresponding to an offer for a product. In an embodiment, determining the set of display options based on the user data includes: accessing a data store of user preferences to obtain a user preference of a user of the personal device; and accessing a product database, where the offer is for a product selected from the product database, the selection is based on the accessed user preference and the user data from the personal device.

In an embodiment, determining aggregated data for the plurality of people for display comprises accessing user data for at least a portion of the plurality of people, cross-referencing the user data for the portion of the plurality of people with the user data from the personal device, and filtering the cross-referenced data to identify similarities.

At 410, the member of the set of display options is displayed on the intelligent signage device.

In a further embodiment, the method 400 includes transmitting to the personal device, data related to the offer.

In a further embodiment, the method 400 includes detecting a plurality of people around the intelligent digital signage and where determining the set of display options and displaying the member of the set of display options comprises determining aggregated data for the plurality of people for display.

Figure 5:
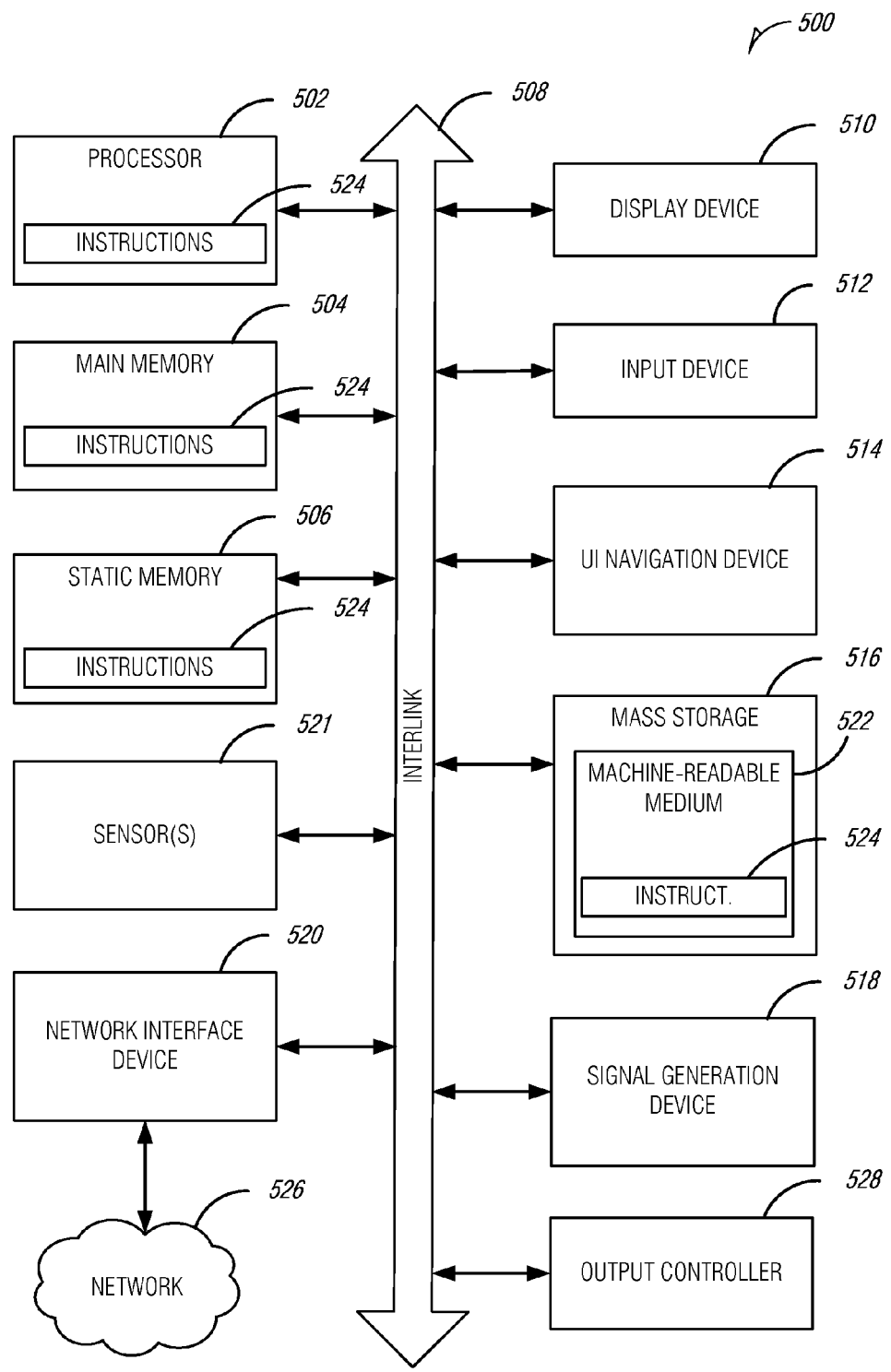
FIG. 5 is a block diagram illustrating an example machine upon which any one or more of the techniques (e.g., methodologies) discussed herein may perform, according to an example embodiment.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. In some embodiments, some of the processing activity may take place in the cloud. For example, after detecting the presence of the mobile device, the ISS may contact cloud-based services to access user preferences for a user of the mobile device. Also, cloud-based services may perform the processing of information found on the personal device to determine user preferences. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 522 is illustrated as a single medium, the term "machine readable medium" may include a single medium or multiple media (e.g., a centralized or distributed database, and/or associated caches and servers) that arranged to store the one or more instructions 524.

The term "machine readable medium" may include any medium that is capable of storing, encoding, or carrying instructions for execution by the machine 800 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a device, apparatus, or user equipment (UE)) comprising an intelligent signage device, the device comprising: a proximity module arranged to receive a notification that a personal device is within an area of the intelligent signage device; a transceiver arranged to: establish a connection from the intelligent signage device to the personal device; and receive user data from the personal device via the connection; an offer-customization module arranged to determine a set of display options based on the user data, a member of the set of display options corresponding to an offer for a product; and a presentation module arranged to display the member of the set of display options on the intelligent signage device.

In Example 2, the subject matter of Example 1 may optionally include to receive the notification, the proximity module is arranged to detect that the personal device is within the area.

In Example 3 the subject matter of any one or both of Examples 1 and 2 may optionally include to establish the connection, the transceiver is arranged to establish a direct connection between the intelligent signage device and the personal device.

In Example 4 the subject matter of any one or more of Examples 1 to 3 may optionally include the user data including a set of user preferences, the set of user preferences designated by a user of the personal device.

In Example 5 the subject matter of any one or more of Examples 1 to 4 may optionally include the user data including a set of user activities, the set of user activities including at least one of user compass orientation, user purchase history, user demographic data, or user movement, the user movement including positions of the user over time within a second area, the area of the intelligent signage device being within the second area.

In Example 6 the subject matter of any one or more of Examples 1 to 5 may optionally include user movement includes user entry and exit of the second area.

In Example 7 the subject matter of any one or more of Examples 1 to 6 may optionally include to determine the set of display options, the offer-customization module is arranged to select a display option corresponding to an offer for a product in an area of the second area that the user has not visited within a time period based on the user movement.

In Example 8 the subject matter of any one or more of Examples 1 to 7 may optionally include the area is an area in close proximity around the intelligent signage device, and wherein the second area is a building containing the intelligent signage device.

In Example 9 the subject matter of any one or more of Examples 1 to 8 may optionally include to determine the set of display options based on the user data, the offer-customization module is arranged to: access a data store of user preferences to obtain a user preference of a user of the personal device; and access a product database, wherein the offer is for a product selected from the product database, the selection is based on the accessed user preference, and the user data from the personal device.

In Example 10 the subject matter of any one or more of Examples 1 to 9 may optionally include the transceiver is arranged to transmit data related to the offer to the personal device.

In Example 11 the subject matter of any one or more of Examples 1 to 10 may optionally include the proximity module is arranged to detect a plurality of people around the intelligent digital signage; and wherein to determine the set of display options includes the offer-customization module arranged to determine aggregated data for the plurality of people.

In Example 12 the subject matter of any one or more of Examples 1 to 11 may optionally include to determine the aggregated data, the offer customization module is arranged to: access user data for at least a portion of the plurality of people; cross-reference the user data for the portion of the plurality of people with the user data from the personal device; and filter the cross-referenced data to identify similarities.

Example 13 may include, or may optionally be combined with the subject matter of any one of Examples 1-12 to include subject matter (such as a method, means for performing acts, machine readable medium including instructions for providing an intelligent signage service that, when performed by a machine cause the machine to performs acts, or an apparatus configured to perform) comprising receiving a notification at an intelligent signage device that a personal device is within an area of the intelligent signage device; establishing a connection from the intelligent signage device to the personal device; receiving user data from the personal device via the connection; determining a set of display options based on the user data, a member of the set of display options corresponding to an offer for a product; and displaying the member of the set of display options on the intelligent signage device.

In Example 14, the subject matter of Example 13 may optionally include receiving the notification includes detecting, by the intelligent signage device that the personal device is within the area.

In Example 15 the subject matter of any one or more of Examples 13 to 14 may optionally include establishing the connection includes establishing a direct connection between the intelligent signage device and the personal device.

In Example 16 the subject matter of any one or more of Examples 13 to 15 may optionally include wherein the user data includes a set of user preferences, the set of user preferences designated by a user of the personal device.

In Example 17 the subject matter of any one or more of Examples 13 to 16 may optionally include wherein the user data includes a set of user activities, the set of user activities including at least one of user compass orientation, user purchase history, user demographic data, or user movement, the user movement including positions of the user over time within a second area, the area of the intelligent signage device being within the second area.

In Example 18 the subject matter of any one or more of Examples 13 to 17 may optionally include wherein user movement includes user entry and exit of the second area.

In Example 19 the subject matter of any one or more of Examples 13 to 14 may optionally include wherein determining the set of display options includes selecting a display option corresponding to an offer for a product in an area of the second area that the user has not visited within a time period based on the user movement.

In Example 20 the subject matter of any one or more of Examples 13 to 19 may optionally include wherein the area is an area in close proximity around the intelligent signage device, and wherein the second area is a building containing the intelligent signage device.

In Example 21 the subject matter of any one or more of Examples 13 to 14 may optionally include wherein determining the set of display options based on the user data includes: accessing a data store of user preferences to obtain a user preference of a user of the personal device; and accessing a product database, wherein the offer is for a product selected from the product database, the selection is based on the accessed user preference and the user data from the personal device.

In Example 22 the subject matter of any one or more of Examples 13 to 21 may optionally include transmitting to the personal device, data related to the offer.

In Example 23 the subject matter of any one or more of Examples 13 to 22 may optionally include detecting a plurality of people around the intelligent digital signage; and wherein determining the set of display options and displaying the member of the set of display options comprises determining aggregated data for the plurality of people for display.

In Example 24 the subject matter of any one or more of Examples 13 to 23 may optionally include wherein determining aggregated data for the plurality of people for display comprises: accessing user data for at least a portion of the plurality of people; cross-referencing the user data for the portion of the plurality of people with the user data from the personal device; and filtering the cross-referenced data to identify similarities.

Example 25 may include, or may optionally be combined with the subject matter of any one of Examples 1-24 to include subject matter (such as a method, means for performing acts, machine readable medium including instructions for providing an intelligent signage service that, when performed by a machine cause the machine to performs acts, or an apparatus configured to perform) comprising a proximity means for receiving a notification that a personal device is within an area of the intelligent signage device; a transceiver means for: establishing a connection from the intelligent signage device to the personal device; and receiving user data from the personal device via the connection; an offer-customization means for determining a set of display options based on the user data, a member of the set of display options corresponding to an offer for a product; and a presentation means for displaying the member of the set of display options on the intelligent signage device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An intelligent signage device, the device comprising:
   a proximity module arranged to receive a notification that a personal device is within an area of the intelligent signage device;
   a transceiver arranged to:
      establish a connection from the intelligent signage device to the personal device; and
      receive user data from the personal device via the connection, the user data including user movement, the user movement including positions of the user over time within a second area, the second area being a building containing the intelligent signage device;
   an offer-customization module arranged to determine a set of display options based on the user data, a member of the set of display options corresponding to an offer for a product selected because it is in an area of the second area that the user has not visited within a time period based on the user movement; and
   a presentation module arranged to display the member of the set of display options on the intelligent signage device.

2. The intelligent signage device of claim 1, wherein to receive the notification, the proximity module is arranged to detect that the personal device is within the area.

3. The intelligent signage device of claim 1, wherein to establish the connection, the transceiver is arranged to establish a direct connection between the intelligent signage device and the personal device.

4. The intelligent signage device of claim 1, wherein the user data, upon which the determination of the set of display options is based, includes a set of user preferences, the set of user preferences designated by a user of the personal device.

5. The intelligent signage device of claim 4, wherein the user data, upon which the determination of the set of display options is based, includes a set of user activities, the set of user activities including at least one of user compass orientation, user purchase history, or user demographic data.

6. The intelligent signage device of claim 5, wherein the area is an area is within a meter around the intelligent signage device.

7. The intelligent signage device of claim 1, wherein the transceiver is arranged to transmit details of the offer to the personal device.

8. The intelligent signage device of claim 1, wherein the proximity module is arranged to detect a plurality of people within a meter around the intelligent digital signage; and
   wherein to determine the set of display options includes the offer-customization module arranged to determine aggregated data for the plurality of people.

9. The intelligent signage device of claim 6, wherein to determine the aggregated data, the offer customization module is arranged to:
   access user data for at least a portion of the plurality of people;

cross-reference the user data for the portion of the plurality of people with the user data from the personal device to identify correlations in the user data; and filter the cross-referenced data for the correlations.

10. A method for providing an intelligent signage service, the method comprising:

receiving a notification at an intelligent signage device that a personal device is within an area of the intelligent signage device;

establishing a connection from the intelligent signage device to the personal device;

receiving user data from the personal device via the connection, the user data including user movement, the user movement including positions of the user over time within a second area, the second area being a building containing the intelligent signage device;

determining a set of display options based on the user data, a member of the set of display options corresponding to an offer for a product selected because it is in an area of the second area that the user has not visited within a time period based on the user movement; and displaying the member of the set of display options on the intelligent signage device.

11. The method of claim 10, wherein receiving the notification includes detecting, by the intelligent signage device that the personal device is within the area.

12. The method of claim 10, wherein establishing the connection includes establishing a direct connection between the intelligent signage device and the personal device.

13. The method of claim 10, wherein the user data, upon which the determination of the set of display options is based, includes a set of user preferences, the set of user preferences designated by a user of the personal device.

14. The method of claim 13, wherein the user data, upon which the determination of the set of display options is based, includes a set of user activities, the set of user activities including at least one of user compass orientation, user purchase history, or user demographic data.

15. The method of claim 14, wherein the area is an area is within a meter around the intelligent signage device.

16. The method of claim 10, comprising:

detecting a plurality of people around the intelligent digital signage; and wherein determining the set of display options and displaying the member of the set of display options comprises determining aggregated data for the plurality of people for display.

17. The method of claim 15, wherein determining aggregated data for the plurality of people for display comprises:

accessing user data for at least a portion of the plurality of people;

cross-referencing the user data for the portion of the plurality of people with the user data from the personal device to identify correlations in the user data; and filtering the cross-referenced data for the correlations.

18. A non-transitory machine-readable medium including instructions that, when executed by a machine, cause the machine to perform operations for an intelligent signage service, the operations comprising:

receiving a notification at an intelligent signage device that a personal device is within an area of the intelligent signage device;

establishing a connection from the intelligent signage device to the personal device;

receiving user data from the personal device via the connection, the user data including user movement, the user movement including positions of the user over time within a second area, the second area being a building containing the intelligent signage device;

determining a set of display options based on the user data, a member of the set of display options corresponding to an offer for a product selected because it is in an area of the second area that the user has not visited within a time period based on the user movement; and displaying the member of the set of display options on the intelligent signage device.

19. The machine-readable medium of claim 18, wherein receiving the notification includes detecting, by the intelligent signage device that the personal device is within the area.

20. The machine-readable medium of claim 18, wherein establishing the connection includes establishing a direct connection between the intelligent signage device and the personal device.

21. The machine-readable medium of claim 18, wherein the user data upon which the determination of the set of display options is based, includes a set of user preferences, the set of user preferences designated by a user of the personal device.

22. The machine-readable medium of claim 21, wherein the user data upon which the determination of the set of display options is based, includes a set of user activities, the set of user activities including at least one of user compass orientation, user purchase history, or user demographic data.

23. The machine-readable medium of claim 22, wherein the area is within a meter around the intelligent signage device.

24. The machine-readable medium of claim 18, comprising:

detecting a plurality of people within a meter around the intelligent digital signage; and wherein determining the set of display options and displaying the member of the set of display options comprises determining aggregated data for the plurality of people for display.

25. The machine-readable medium of claim 23, wherein determining aggregated data for the plurality of people for display comprises:

accessing user data for at least a portion of the plurality of people;

cross-referencing the user data for the portion of the plurality of people with the user data from the personal device to identify correlations in the user data; and filtering the cross-referenced data for the correlations.

* * * * *

UNITED STATES PATENT AND TRADEMARK OFFICE
CERTIFICATE OF CORRECTION

PATENT NO. : 9,460,453 B2
APPLICATION NO. : 13/991312
DATED : October 4, 2016
INVENTOR(S) : Rider et al.

Page 1 of 1

It is certified that error appears in the above-identified patent and that said Letters Patent is hereby corrected as shown below:

In the Claims

In Column 14, Line 29, in Claim 21, after "data", insert --,--, therefor

In Column 14, Line 34, in Claim 22, after "data", insert --,--, therefor

Signed and Sealed this
Twenty-seventh Day of March, 2018

Andrei Iancu
*Director of the United States Patent and Trademark Office*